(12) United States Patent
Zeng (10) Patent No.: US 12,122,442 B2
(45) Date of Patent: Oct. 22, 2024

(54) STROLLER FRAME LOCKING MECHANISM AND STROLLER HAVING THE SAME

(71) Applicant: WONDERLAND SWITZERLAND AG, Steinhausen (CH)

(72) Inventor: Haibo Zeng, Guangdong (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 325 days.

(21) Appl. No.: 17/566,185

(22) Filed: Dec. 30, 2021

(65) Prior Publication Data
US 2022/0212709 A1   Jul. 7, 2022

(30) Foreign Application Priority Data
Jan. 4, 2021  (CN) .......................... 202110002602.0

(51) Int. Cl.
*B62B 7/06* (2006.01)

(52) U.S. Cl.
CPC ............ *B62B 7/06* (2013.01); *B62B 2205/20* (2013.01)

(58) Field of Classification Search
CPC .. B62B 7/06; B62B 7/08; B62B 7/064; B62B 7/083; B62B 7/004; B62B 2205/20; B62B 2205/003; B62B 9/10; B62B 9/20
See application file for complete search history.

(56) References Cited

U.S. PATENT DOCUMENTS 3,079,166 A * 2/1963 Abgarian ................ B62B 1/045
                                            280/DIG. 3
4,369,986 A * 1/1983 de la Fe .................... B62B 7/08
                                            403/100
(Continued)

FOREIGN PATENT DOCUMENTS

CN    100453377 C    1/2009
CN    201258000 Y    6/2009
(Continued)

OTHER PUBLICATIONS

Chinese Search Report issued from corresponding Chinese Application No. 202110002602.0, mailed Sep. 10, 2021, pp. 1-12.
(Continued)

*Primary Examiner* — Steve Clemmons
(74) *Attorney, Agent, or Firm* — HAUPTMAN HAM, LLP (57) ABSTRACT

The disclosure provides a stroller frame locking mechanism and a stroller having the same. The stroller frame comprises a stroller handle, a front wheel bracket, and a rear wheel bracket, both the front wheel bracket and the rear wheel bracket being pivotally connected to the stroller handle. The stroller frame locking mechanism comprises: a support assembly supported between the front wheel bracket and the rear wheel bracket, the support assembly comprising a first support member and a second support member pivotally connected to each other, the first support member being pivotally connected to the front wheel bracket, and the second support member being pivotally connected to the rear wheel bracket; and a locking device arranged to lock or unlock the support assembly, such that the first support member and the second support member is unable to pivot or able to pivot in respect to each other.

16 Claims, 7 Drawing Sheets

(56) References Cited

U.S. PATENT DOCUMENTS

| | | | | |
|---|---|---|---|---|
| 5,685,660 | A * | 11/1997 | Liao | E05D 11/1007 384/585 |
| 6,820,891 | B2 * | 11/2004 | Suga | B62B 7/08 280/47.38 |
| 6,979,017 | B2 * | 12/2005 | Chen | B62B 9/26 280/642 |
| 8,328,208 | B2 * | 12/2012 | Chen | B60N 2/2848 280/47.38 |
| 8,936,267 | B2 * | 1/2015 | Li | B62B 7/00 280/30 |
| 9,399,477 | B2 * | 7/2016 | Iftinca | B62B 9/104 |
| 9,517,789 | B2 * | 12/2016 | Pacella | B62B 9/28 |
| 9,840,168 | B2 * | 12/2017 | Yi | B62B 7/142 |

FOREIGN PATENT DOCUMENTS

| | | | |
|---|---|---|---|
| CN | 203698360 U | 7/2014 | |
| CN | 204055907 U | 12/2014 | |
| CN | 104691597 A | 6/2015 | |
| CN | 102975757 B | 3/2016 | |
| CN | 205273572 U | 6/2016 | |
| CN | 205327134 U | 6/2016 | |
| CN | 206465987 U | 9/2017 | |
| CN | 207241787 U * | 4/2018 | |
| CN | 209336791 U | 9/2019 | |
| CN | 104816750 B | 11/2019 | |
| CN | 111497920 A | 8/2020 | |
| CN | 212243510 U | 12/2020 | |
| CN | 112793652 A | 5/2021 | |
| EP | 3626578 A1 | 3/2020 | |
| IN | 201646812 U | 11/2010 | |
| JP | 2019055773 A * | 4/2019 | B62B 7/06 |
| TW | 201429773 A | 8/2014 | |

OTHER PUBLICATIONS

Taiwanese 1st Office Action issued in corresponding Taiwanese Patent No. 110149053, dated Oct. 4, 2022, pp. 1-8.

* cited by examiner

STROLLER FRAME LOCKING MECHANISM AND STROLLER HAVING THE SAME

TECHNICAL FIELD

The present disclosure relates to a field of strollers, and particularly to a stroller frame locking mechanism and a stroller having the stroller frame locking mechanism.

BACKGROUND

At present, most of strollers commercially used have foldable structures, which are unfolded for seating when in use and are folded and gathered for storage or carrying when not in use. Moreover, there are various and different types of the foldable structures at present, but most of them can only be unfolded or folded after locking or unlocking of the front and rear wheel brackets as well as the stroller handle are respectively performed.

BRIEF DESCRIPTION OF THE DRAWINGS

The accompanying drawings are included herein for providing a further understanding of the disclosure and are incorporated into the specification to form a part thereof. The accompanying drawings show embodiments of the disclosure and are used to illustrate the concepts of the disclosure together with the following description.

In the drawings.

DETAILED DESCRIPTION

Example embodiments will now be described more fully with reference to the accompanying drawings. However, the example embodiments can be implemented in various forms, and should not be construed as being limited to the embodiments set forth herein. On the contrary, these embodiments are provided such that the disclosure will be comprehensive and complete, and fully convey the concept of the example embodiments to those skilled in the art. The same reference numerals in the drawings represent the same or similar structures, and thus their detailed descriptions will be omitted.

The foldable structures at present have many operation steps to be performed, and the process of folding is complex, time-consuming and laborious. The stroller frame locking mechanism in this disclosure will avoid these problems.

The strollers described in this disclosure generally refer to those used for children and for people with limited mobility. Referring to FIGS. 1 to 7, a stroller frame 10 for a stroller according to the disclosure includes a front wheel bracket 12, a rear wheel bracket 13, and a stroller handle 11. Among them, a front wheel is amounted at a lower end of the front wheel bracket 12, and a wheel is amounted at a lower end of the rear wheel bracket 13, so as to facilitate to move the stroller. The stroller handle 11 is used to provide a force application site for the user to push or pull the stroller. The front wheel bracket 12 and the rear wheel bracket 13 are both pivotally connected to the stroller handle 11, such that the three brackets can be folded in respect to each other, so as to facilitate gathering of the stroller.

Furthermore, the stroller frame 10 can also includes a handrail bracket, a canopy bracket for supporting a stroller canopy, and a seat rod for supporting a child seat, etc. All such components can be arranged according to actual needs, which are not specifically described in the disclosure.

It would be noted, the configuration of the stroller frame 10 of the disclosure is not limited to that shown in the attached drawings. For example, the stroller frame may be composed of two rear wheel brackets 13 and one front wheel bracket 12 as well as the stroller handle 11, or the stroller frame may be composed of two front wheel brackets 12 and one rear wheel bracket 13 as well as the stroller handle 11. The numbers of the front wheel brackets 12 and the rear wheel brackets 13 would be set depends on actual needs. For another example, the shape of the stroller handle 11 may also be various, and may be a common U-shaped rod, or may be a long push rod, a circular ring and other special shapes.

A stroller frame locking mechanism is disposed between the front wheel bracket 12 and the rear wheel bracket 13. The stroller frame locking mechanism is pivotally connected to the front wheel bracket 12 and the rear wheel bracket 13 at lower middle positions, such that the front wheel bracket 12 and the rear wheel bracket 13 may be folded along a direction close to each other or unfolded along a direction away from other, thereby realizing folding or unfolding of the entire stroller frame.

Hereinafter, the stroller frame locking mechanism of the disclosure will be described in detail in combination with FIGS. 2 to 6.

Figure 2:
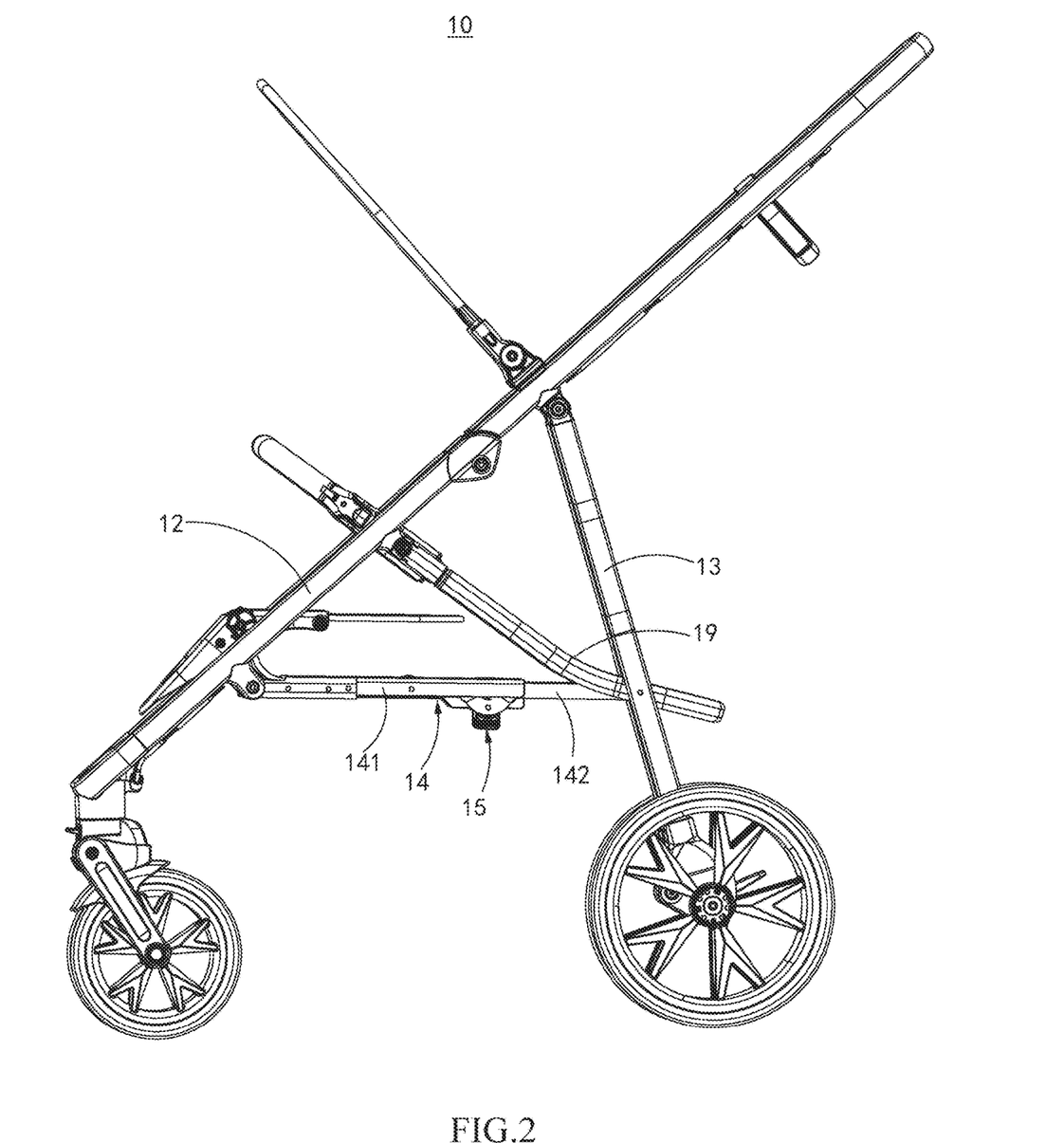
FIG. 2 is a side view of the stroller having the stroller frame locking mechanism according to the disclosure.

FIG. 2 more clearly shows position relationships and connection relationships of the front wheel bracket 12, the rear wheel bracket 13, and the stroller frame locking mechanism when the stroller frame is in an unfolded state. When the stroller frame 10 for the stroller is in the unfolded state, the front wheel bracket 12, the rear wheel bracket 13 and the stroller frame locking mechanism form a triangular structure among them, thereby enhancing a stability of the stroller frame 10.

Figure 3:
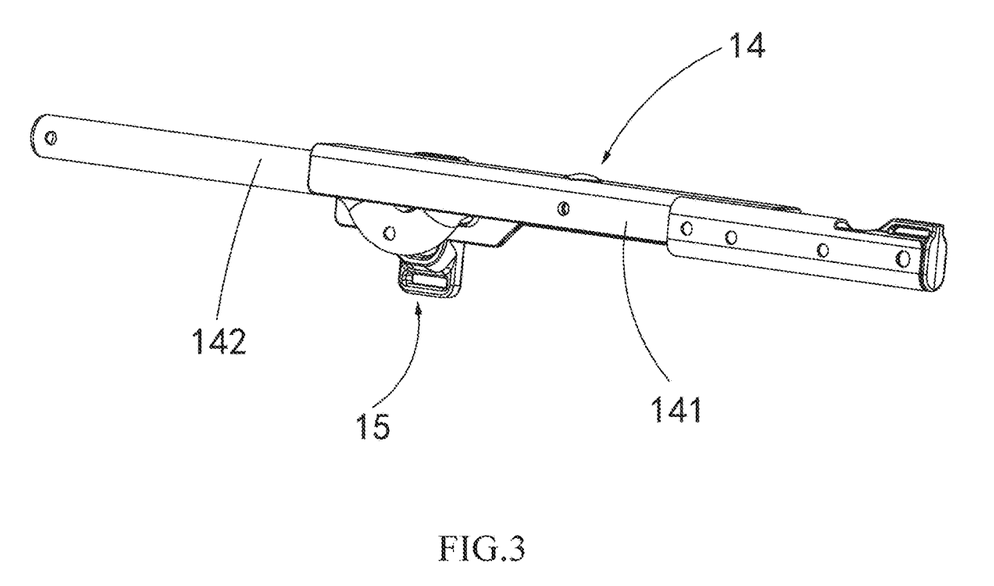
FIG. 3 is a perspective view of the stroller frame locking mechanism according to the disclosure.
Figure 4:
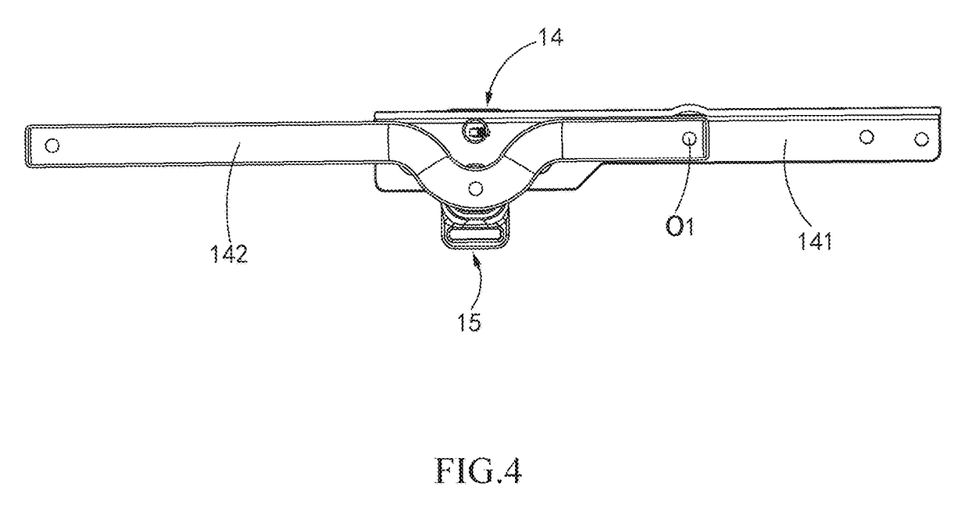
FIG. 4 is a side cross-sectional view of the stroller frame locking mechanism in FIG. 3.

The stroller frame locking mechanism of the disclosure may include a support assembly 14 and a locking device 15. As shown in FIG. 2, the support assembly 14 may be supported between the front wheel bracket 12 and the rear wheel bracket 13. As shown in FIGS. 3 and 4, the locking device 15 may be disposed on the support assembly 14. The locking device 15 is to lock or unlock the support assembly 14, and the front wheel bracket 12 and the rear wheel bracket 13 are unfolded or folded by pivoting of the support assembly 14, thereby realizing unfolding or folding of the entire stroller frame 10.

Specifically, the support assembly 14 may include a first support member 141 and a second support member 142 pivotally connected to each other. As shown in FIG. 2, the first support member 141 is pivotally connected to the front wheel bracket 12, and the second support member 142 is pivotally connected to the rear wheel bracket 13. Thus, on the one hand, when the first support member 141 and the second support member 142 are locked so as not to pivot in respect to each other, the front wheel bracket 12 and the rear wheel bracket 13 can be prohibited from being pivoted in respect to each other, thereby maintaining the entire stroller frame 10 in the unfolded state. On the other hand, when the first support member 141 and the second support member 142 is unlocked and can be pivoted in respect to each other, the front wheel bracket 12 and the rear wheel bracket 13 may be brought to pivot in respect to each other, such that the entire stroller frame 10 is folded.

In another embodiment, as shown in FIGS. 3 to 6, the first support member 141 may be a U-shaped part having a U-shaped groove, and the second support member 142 may be a rod-shaped part. Furthermore, the second support member 142 is at least partially located in the U-shaped groove of the first support member 141. Specifically, referring to FIG. 4, when the stroller frame is in the unfolded state, the second support member 142 at least partially overlaps the first support member 141, and an end of the second support member 142 is pivotally connected to the first support member 141 via a support pivot O1.

It would be noted, the disclosure is not limited to the above embodiments. Furthermore, the first support member 141 and the second support member 142 may be pivotally connected to each other at their ends. In addition, the first support member 141 does not have to be a U-shaped part, and it may also be a rod-shaped part. At the same time, the shapes of the first support member 141 and the second support member 142 may be various, as long as the first support member and the second support member can be pivoted in respect to each other. In addition, the numbers of the first support member and the second support member may also be set according to actual needs, which is not limited in the disclosure.

In order to perform non-pivoting or pivoting of the support assembly 14, the disclosure proposes a locking device 15. The locking device 15 can be locked at the support pivot O1 where the first support member 141 and the second support member 142 are pivotally connected, or can be locked at an area where the first support member 141 and the second support member 142 partially overlap.

When the first support member 141 and the second support member 142 are pivotally connected to each other at their ends, the locking device 15 can be a rigid sleeve which may slide along the first support member 141 and the second support member 142. Once the rigid sleeve slides to a position where it is simultaneously sleeved on the end of the first support member 141 and the end of the second support member 142, the first support member 141 and the second support member 142 are locked by the rigid sleeve so they cannot be pivoted in respect to each other, i.e., the support assembly 14 is locked. Once the rigid sleeve slides onto the first support member 141 or the second support member 142, the first support member 141 and the second support member 142 are not restricted by the rigid sleeve and they can be pivoted in respect to each other, i.e., the support assembly 14 is unlocked.

FIGS. 1 to 6 show an embodiment of the disclosure, in which the first support member 141 and the second support member 142 have a partially overlapped area, and the locking device 15 is arranged in the partially overlapped area. Specifically, the locking device 15 includes a first locking member 151 and a second locking member 152 which can be locked or unlocked in respect to each other. The first locking member 151 may be movably connected to the first support member 141, and the second locking member 152 is fixedly connected to the second support member 142 at a position corresponding to the first locking member 151, such that non-pivoting or pivoting of the support assembly 14 is realized by locking or unlocking between the first locking member 151 and the second locking member 152.

Figure 5:
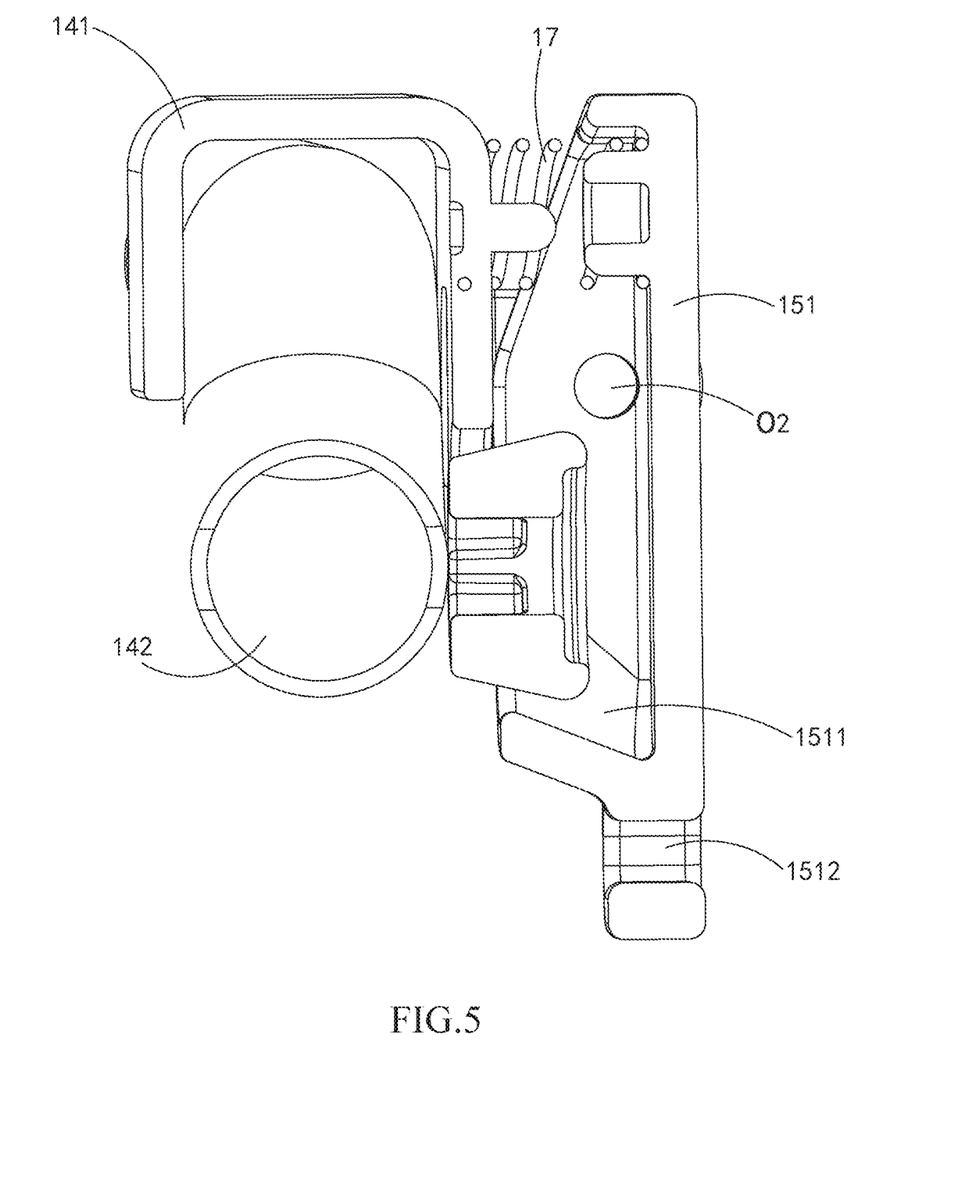
FIG. 5 is a perspective view of the locking device in a locked state.
Figure 6:
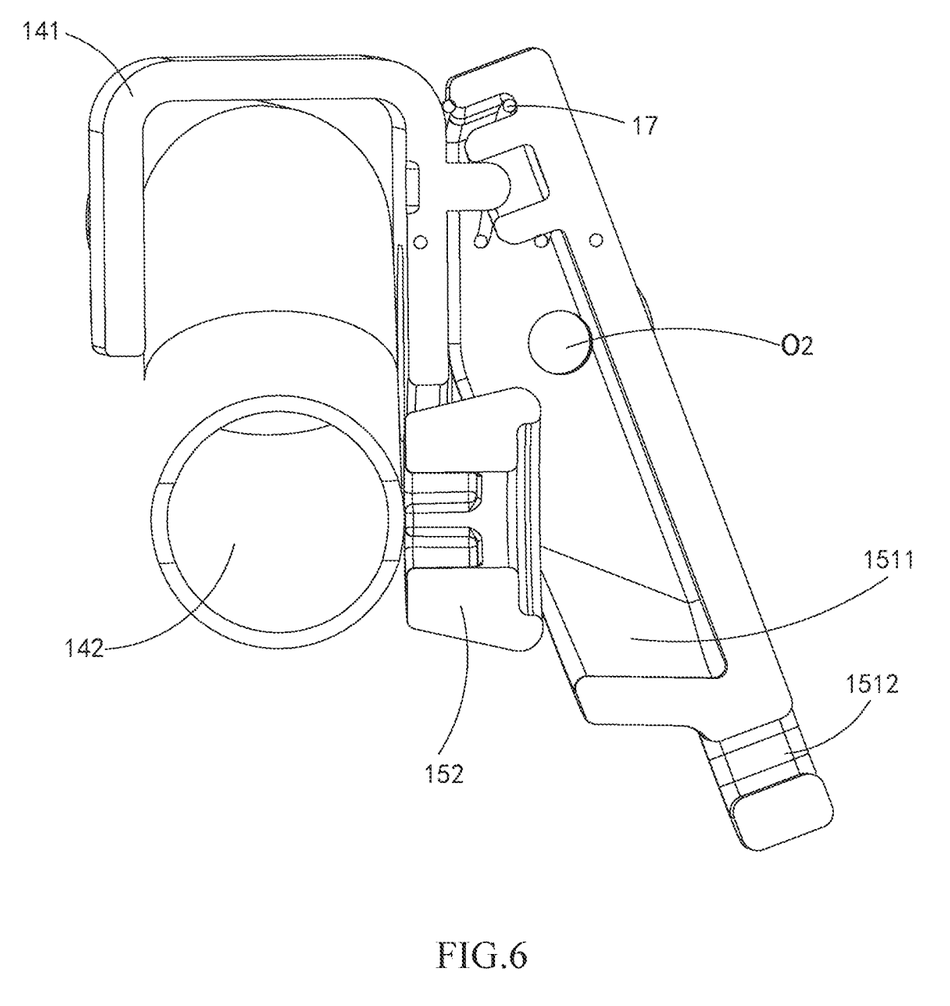
FIG. 6 is a perspective view of the locking device in an unlocked state.

As shown in FIGS. 5 and 6, a middle portion of the first locking member 151 is pivotally connected to the first support member 141 via a locking pivot O2, a lower portion of the first locking member 151 has a recess 1511, and the second locking member 152 is a locking block which can be engaged with the recess 1511. When the first locking member 151 is adaptively engaged with the second locking member 152 so that the first locking member 151 and the second locking member 152 are locked to each other, the first support member 141 and the second support member 142 are locked by the locking device 15 and cannot be pivoted in respect to each other, i.e., the support assembly 14 locked, thereby maintaining the entire stroller frame 10 in the unfolded state. When the first locking member 151 is pivoted about the locking pivot O2 to disengage the recess 1511 from the second locking member 152, such that when the first locking member 151 and the second locking member 152 are unlocked, the first support member 141 and the second support member 142 are not restricted by the locking device 15 and can be pivoted in respect to each other, i.e., the support assembly 14 is unlocked, so the entire stroller frame 10 can be folded.

It would be understood, the structure of the locking device of the disclosure is not limited to those described above. For example, the first locking member may be a movable hook-shaped part, and the second locking member may be a ring-shaped part fitted the hook-shaped part, as long as mutual locking of the first locking member and the second locking member can be achieved.

As shown in FIG. 5, an elastic member 17 may be disposed between an upper portion of the first locking member 151 and the first support member 141. The elastic member 17 acts on the upper portion of the first locking member 151, such that the upper portion of the first locking member 151 is pivoted away from the first support member 141, thereby causing a lower portion of the first locking member 151 to pivot toward the second locking member 152, until the recess 1511 of the first locking member 151 engages with the second locking member 152, so as to achieve locking between the first locking member 151 and the second locking member 152. In other words, if the first locking member 151 is not subjected to other external forces, the elastic member 17 will keep the first locking member 151 and the second locking member 152 in a locked state. When the first locking member 151 and the second locking member 152 need to be unlocked, it is necessary to have other external force acting on the first locking member 151, further acting on the lower portion of the first locking member 151. For example, the user may pull the first locking member 151 with a hand, such that the upper portion of the first locking member 151 overcomes the force of the elastic member 17 and is pivoted toward the first support member 141, thus the lower portion of the first locking member 151 is pivoted away from the second locking member 152, until the recess 1511 of the first locking member 151 is disengaged from the second locking member 152, so as to unlock the locking device 15.

Figure 7:
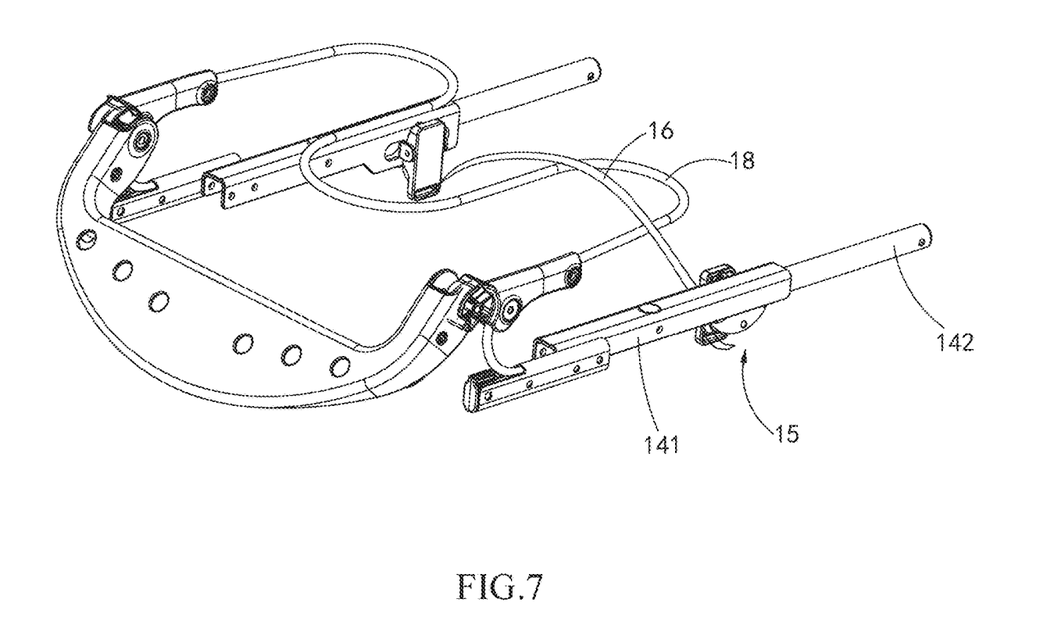
FIG. 7 is a perspective view of the stroller frame locking mechanism provided with an elastic iron wire and a pulling strap.

In order to facilitate operation of the user, as shown in FIG. 7, the stroller frame locking mechanism may further include a pulling strap 16, and both ends of the pulling strap 16 are connected to the lower portion of the first locking member 151 respectively. So when the user pulls the pulling strap 16 upwardly, the pulling strap 16 may bring the lower portion of the first locking member 151 to pivot away from the second locking member 152, until the recess 1511 of the first locking member 151 is disengaged from the second locking member 152, so as to unlock the locking device 15, such that the first support member 141 and the second support member 142 can be gathered to each other, and finally achieving folding of the entire stroller frame 10. With this arrangement of the pulling strap 16, the user can drive the locking device 15 to unlock by pulling the pulling strap 16 with a single hand, and bring the support assembly 14 to be gathered inward, such that the front wheel bracket 12 and the rear wheel bracket 13 are folded, so as to realize gathering of the stroller with simple, time-saving and labor-saving operation.

Referring to FIGS. 5 and 6, the lower portion of the first locking member 151 may also include a through hole 1512, the end(s) of the pulling strap 16 may pass through the through hole 1512, so as to facilitate the connection between the pulling strap 16 and the first locking member 151. The shape of the through hole 1512 may be round, oval, rectangular, or the like. Furthermore, it would be noted, the connection method of the pulling strap 16 and the first locking member 151 is not limited to the above-mentioned method of passing through the through hole 1512, and may also be connected by other methods, such as a buckle connection method.

Figure 1:
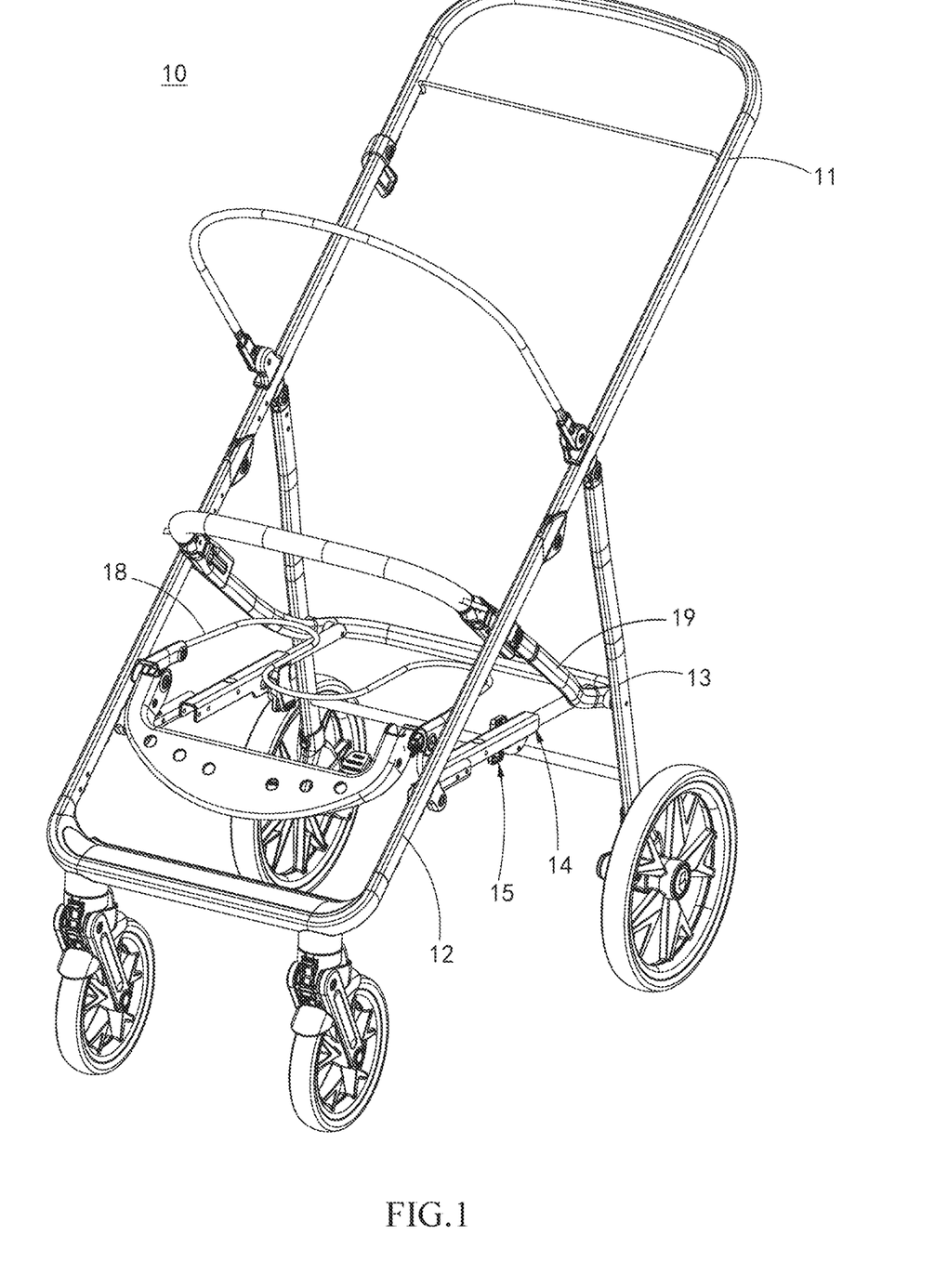
FIG. 1 is a perspective view of a stroller having a stroller frame locking mechanism according to the disclosure.

As best seen in FIGS. 1 and 7, the stroller according to the disclosure may further include an elastic iron wire 18 for carry a seat. An end of the elastic iron wire 18 is connected to an end of the first support member 141 to which the front wheel bracket 12 is pivotally connected. The elastic iron wire 18 plays an auxiliary bearing role for the seat.

As shown in FIGS. 1 and 2, the stroller according to the disclosure may further include a handrail bracket 19. A rear portion of the handrail bracket 19 is pivotally connected to the rear wheel bracket 13, and the second support member 142 of the support assembly 14 and the rear portion of the handrail bracket 19 are pivotally connected to the rear wheel bracket 13 via a same pivot, such that the handrail bracket 19 is brought to be unfolded or folded by the movement of the support assembly 14.

Hereinafter, the exemplary embodiment shown in FIGS. 5 and 6 will be used to describe in detail how the locking device of the disclosure quickly unlocks the support assembly 14, so as to realize rapid folding of the entire stroller frame 10.

When the user pulls the pulling strap 16 to drive the first locking member 151 to pivot upwardly about the locking pivot O2, the lower portion of the first locking member 151 is moved away from the second locking member 152, until the recess 1511 of the first locking member 151 is disengaged from the second locking member 152. At this time, the first support member 141 and the second support member 142 can be pivoted close to each other about the support pivot O1, and at the same time, the front wheel bracket 12 being pivotally connected to the first support member 141 and the rear wheel bracket 13 being pivotally connected to the second support member 142 are also pivoted toward each other respectively brought by the first support member 141 and the second support member 142, and meanwhile the handrail bracket 19 which is pivotally connected to the second support member 142 is brought to move in a direction close to the rear wheel bracket 13, so as to realize folding of the stroller frame 10. Therefore, according to the above arrangement of the stroller frame locking mechanism of the disclosure, the quick folding of the entire stroller frame can be realized by only unlock the locking device so the locking device and the support assembly are pivoted in respect to each other, which is convenient to operate, simple in structure, and having advantages of time-saving and labor-saving.

The foregoing embodiments and advantages are only exemplary, and should not be regarded as limiting the disclosure. The description herein is intended to be an example, rather than limiting the scope of the claims. For those skilled in the art, various alternatives, modifications and modifications are apparent. The features, structures, methods, and other characteristics of the exemplary embodiments described herein can be combined in various ways to obtain other and/or alternative exemplary embodiments.

Since the characteristics of the disclosure can be embodied in various forms without departing from the characteristics of the disclosure, it should also be understood, the above-mentioned embodiments are not limited to any details described above, unless otherwise noted, on the contrary, those embodiments should be interpreted broadly as being within the scope defined by the appended claims. Therefore, all modifications and variations falling within the scope and limits of the claims or equivalent solutions of such scope and limits shall be covered by the appended claims.

LIST OF REFERENCE SIGNS 10 stroller frame
11 stroller handle
12 front wheel bracket
13 rear wheel bracket
14 support assembly
   141 first support member
   142 second support member
15 locking device
   151 first locking member
      1511 recess
      1512 through hole
   152 second locking member
16 pulling strap
17 elastic member
18 elastic iron wire
19 handrail bracket
O1 support pivot
O2 locking pivot

What is claimed is:

1. A stroller frame locking mechanism for unfolding or folding a stroller frame, the stroller frame comprising a stroller handle, a front wheel bracket, and a rear wheel bracket, both the front wheel bracket and the rear wheel bracket being pivotally connected to the stroller handle, wherein the stroller frame locking mechanism comprises:

a support assembly supported between the front wheel bracket and the rear wheel bracket, the support assembly comprising a first support member and a second support member pivotally connected to each other, the first support member being pivotally connected to the front wheel bracket, and the second support member being pivotally connected to the rear wheel bracket; and    a locking device, the locking device being arranged to lock or unlock the support assembly, such that the first support member and the second support member is unable to pivot or able to pivot in respect to each other, wherein the locking device comprises a first locking member and a second locking member which can be locked or unlocked in respect to each other, the first locking member is movably connected to the first support member, the second locking member is fixedly connected to the second support member at a position corresponding to the first locking member, such that locking or unlocking of the support assembly is realized by locking or unlocking between the first locking member and the second locking member.

2. The stroller frame locking mechanism according to claim 1, wherein the first support member is a U-shaped part having a U-shaped groove, the second support member is a rod-shaped part, the second support member is at least partially located in the U-shaped groove of the first support member, and an end of the second support member is pivotally connected to the first support member via a support pivot.

3. A stroller, wherein the stroller comprises the stroller frame locking mechanism according to claim 2.

4. The stroller frame locking mechanism according to claim 1, wherein a middle portion of the first locking member is pivotally connected to the first support member via a locking pivot, a lower portion of the first locking member has a recess, the second locking member is a locking block arranged to be engaged with the recess, such that the first locking member and the second locking member are locked to each other.

5. The stroller frame locking mechanism according to claim 4, wherein the stroller frame locking mechanism further comprises a pulling strap, and an end of the pulling strap is connected to the lower portion of the first locking member, such that the pulling strap is able to pull the lower portion of the first locking member to pivot away from the second locking member.

6. The stroller frame locking mechanism according to claim 5, wherein the lower portion of the first locking member comprises a through hole for the pulling strap to pass therethrough.

7. A stroller, wherein the stroller comprises the stroller frame locking mechanism according to claim 6.

8. A stroller, wherein the stroller comprises the stroller frame locking mechanism according to claim 5.

9. The stroller frame locking mechanism according to claim 4, wherein an elastic member is disposed between an upper portion of the first locking member and the first support member, and the elastic member acts on the upper portion of the first locking member, such that the lower portion of the first locking member pivots toward the second locking member.

10. A stroller, wherein the stroller comprises the stroller frame locking mechanism according to claim 9.

11. A stroller, wherein the stroller comprises the stroller frame locking mechanism according to claim 4.

12. The stroller frame locking mechanism according to claim 1, wherein the first locking member is a movable hook-shaped part, and the second locking member is a ring-shaped part fitted the hook-shaped part.

13. A stroller, wherein the stroller comprises the stroller frame locking mechanism according to claim 12.

14. A stroller, wherein the stroller comprises the stroller frame locking mechanism according to claim 1.

15. The stroller according to claim 14, wherein the stroller further comprises an elastic iron wire for carrying a seat, an end of the elastic iron wire is connected to an end of the first support member to which the front wheel bracket is pivotally connected.

16. The stroller according to claim 14, wherein the stroller further comprises a handrail bracket, a rear portion of the handrail bracket is pivotally connected to the rear wheel bracket, and the second support member of the support assembly and the rear portion of the handrail bracket are pivotally connected to the rear wheel bracket via a pivot.

* * * * *